United States Patent
Aiba

(10) Patent No.: US 10,104,256 B2
(45) Date of Patent: Oct. 16, 2018

(54) ELECTRONIC DEVICE THAT ENSURES REDUCED POWER CONSUMPTION, ELECTRIC POWER CONTROL METHOD, AND RECORDING MEDIUM

(71) Applicant: KYOCERA Document Solutions Inc., Osaka (JP)

(72) Inventor: Masaaki Aiba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 253 days.

(21) Appl. No.: 15/187,092

(22) Filed: Jun. 20, 2016

(65) Prior Publication Data

US 2017/0034381 A1 Feb. 2, 2017

(30) Foreign Application Priority Data

Jul. 31, 2015 (JP) ................................. 2015-151951
Jul. 31, 2015 (JP) ................................. 2015-152924

(51) Int. Cl.
*G06F 1/00* (2006.01)
*G06F 1/26* (2006.01)
(Continued)

(52) U.S. Cl.
CPC ....... *H04N 1/00896* (2013.01); *G06F 1/3209* (2013.01); *G06F 1/3287* (2013.01);
(Continued)

(58) Field of Classification Search
CPC ...................................................... G06F 1/32
See application file for complete search history.

(56) References Cited

U.S. PATENT DOCUMENTS

| | | | |
|---|---|---|---|
| 6,542,727 B1 * | 4/2003 | Kikuchi | ............. H04W 52/029 455/343.1 |
| 2005/0182976 A1 | 8/2005 | Berkes et al. | ................ 713/300 |

(Continued)

FOREIGN PATENT DOCUMENTS

| | | | |
|---|---|---|---|
| JP | 2005-234936 A | 9/2005 | |
| JP | 2005234936 A | * 9/2005 | ............... G06F 1/32 |

(Continued)

OTHER PUBLICATIONS

NPL search included by MR, Aug. 22, 2018, 2 pages (Year: 2018).*

(Continued)

*Primary Examiner* — Mohammed H Rehman
(74) *Attorney, Agent, or Firm* — Stein IP, LLC

(57) ABSTRACT

An electronic device includes a first processing device, a second processing device, and a power state control unit. The power state control unit controls a power state of the electronic device. The power state includes a normal state and a power-saving state. The second processing device ensures the execution of the process according to the received data in the normal state. The power-saving state at least temporarily stops supplying the second processing device with electric power while the first processing device ensures the execution of the process according to first received data. When a temporary wake up of the electric power supply to the second processing device is intermittently repeated in the power-saving state, the power state control unit determines a time interval from a termination of the temporary wake up to a start of a subsequent temporary wake up based on a specific condition during the temporary wake up.

8 Claims, 10 Drawing Sheets

(51) Int. Cl.
*G06F 1/32* (2006.01)
*H04N 1/00* (2006.01)
*H04L 12/12* (2006.01)

(52) U.S. Cl.
CPC ............ *G06F 1/3293* (2013.01); *H04L 12/12* (2013.01); *H04N 1/00904* (2013.01); *H04N 2201/0094* (2013.01); *Y02D 10/122* (2018.01); *Y02D 10/171* (2018.01)

(56) References Cited

U.S. PATENT DOCUMENTS

| | | | |
|---|---|---|---|
| 2006/0190578 A1* | 8/2006 | Nelson | H04L 43/0852 709/223 |
| 2011/0087744 A1* | 4/2011 | Deluca | G06Q 10/107 709/206 |
| 2011/0208986 A1 | 8/2011 | Soga | 713/323 |
| 2011/0276813 A1 | 11/2011 | Kamijima | 713/320 |
| 2014/0344599 A1* | 11/2014 | Branover | G06F 1/3234 713/323 |
| 2014/0355052 A1 | 12/2014 | Mikashima | 358/1.15 |
| 2016/0124930 A1* | 5/2016 | Dhawan | G06F 17/243 715/224 |

FOREIGN PATENT DOCUMENTS

| | | | | |
|---|---|---|---|---|
| JP | 2011-235493 A | | 11/2011 | |
| JP | 2011235493 A | * | 11/2011 | ........... G06F 1/3293 |
| JP | 2013-111854 A | | 6/2013 | |
| JP | 2014-231175 A | | 12/2014 | |

OTHER PUBLICATIONS

Japanese Office Action dated Jan. 30, 2018, issued by the Japanese Patent Office in corresponding application JP 2015-151951.
Japanese Office Action dated Jan. 20, 2018, issued by the Japanese Patent Office in corresponding application JP 2015-152924.
Extended European Search Report dated Dec. 2, 2016, issued by the European Patent Office in corresponding application 16178424.4.

* cited by examiner

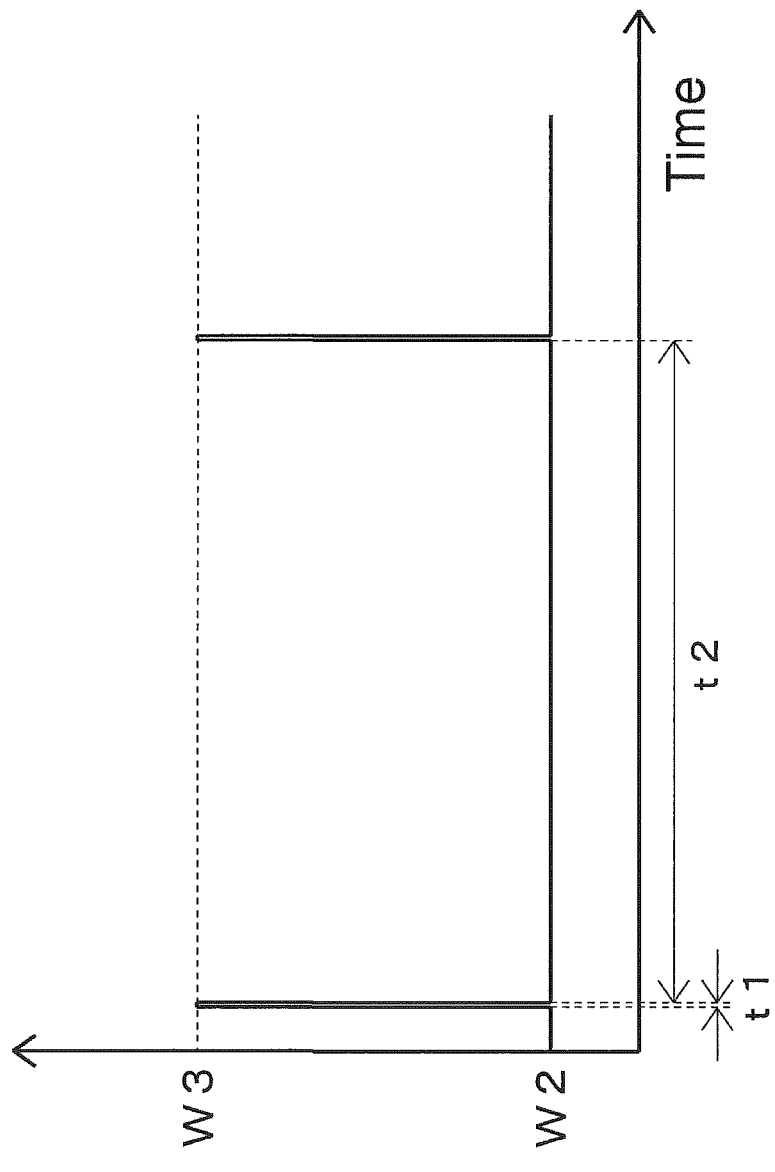

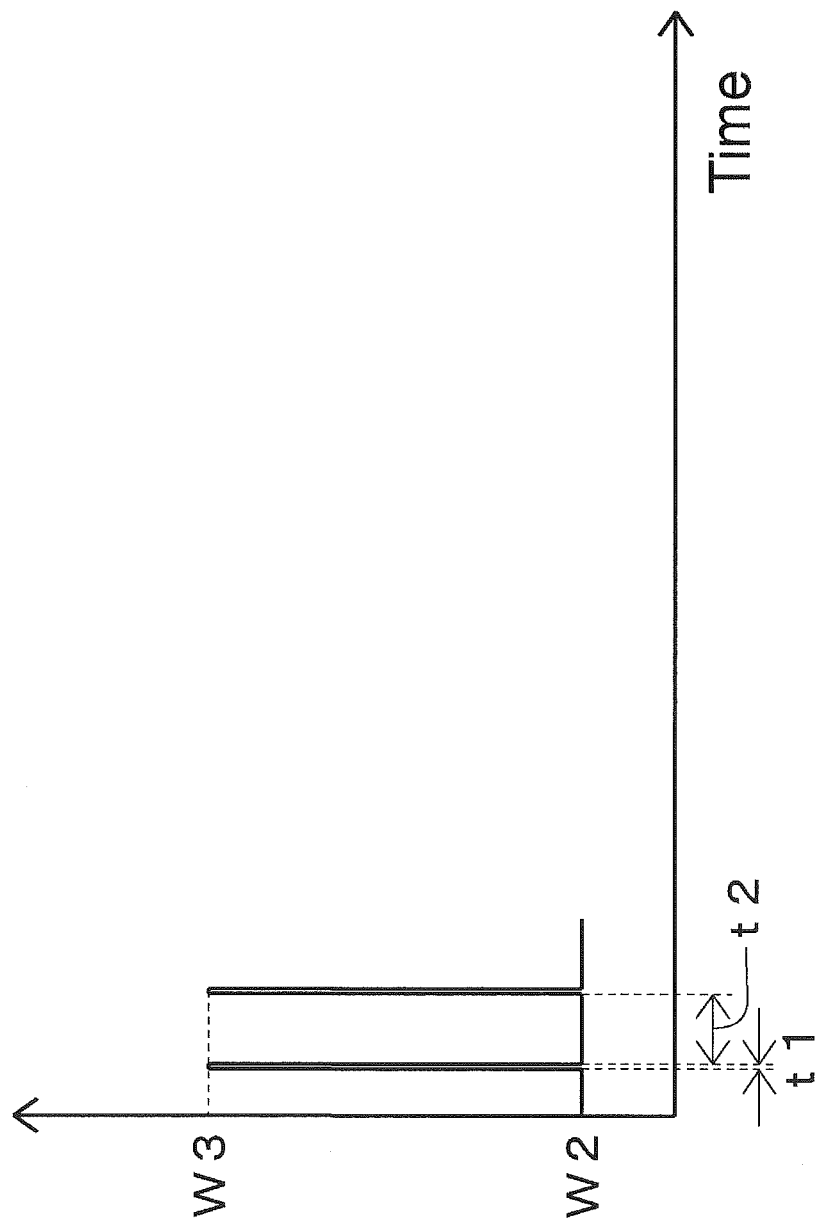

ELECTRONIC DEVICE THAT ENSURES REDUCED POWER CONSUMPTION, ELECTRIC POWER CONTROL METHOD, AND RECORDING MEDIUM

INCORPORATION BY REFERENCE

This application is based upon, and claims the benefit of priority from, corresponding Japanese Patent Application Nos. 2015-151951 and 2015-152924, each filed in the Japan Patent Office on Jul. 31, 2015, the entire contents of which are incorporated herein by reference.

BACKGROUND

Unless otherwise indicated herein, the description in this section is not prior art to the claims in this application and is not admitted to be prior art by inclusion in this section.

There has been known a typical image forming apparatus that includes a first processing device and a second processing device. The first processing device can execute a process according to received data. The second processing device is able to execute a process according to received data that is not compatible with the first processing device. This image forming apparatus has power states of normal state and power-saving state. In the normal state, the second processing device is able to execute the process according to the received data. In the power-saving state, the supply of electric power to the second processing device is at least temporarily stopped while the first processing device ensures executing the process according to the received data. Assume the case where temporary wake up of the electric power supply to the second processing device in the typical image forming apparatus is intermittently repeated in the power-saving state. The image forming apparatus determines a time interval from when the current temporary wake up is terminated until when a subsequent temporary wake up starts in the power-saving state according to a length of a period of the current temporary wake up in the power-saving state.

SUMMARY

An electronic device according to one aspect of the disclosure includes a first processing device, a second processing device, and a processor. The first processing device executes a process according to first received data of received data including the first received data and second received data. The second processing device executes a process according to the second received data unprocessable by the first processing device. The processor executes a control program. When executing the control program, the processor operates to control a power state of the electronic device. The power state includes a normal state and a power-saving state. The second processing device ensures the execution of the process according to the received data in the normal state. The power-saving state at least temporarily stops supplying the second processing device with electric power while the first processing device ensures the execution of the process according to the first received data. When executing the control program, the processor further operates to determine, when a temporary wake up of the electric power supply to the second processing device is intermittently repeated in the power-saving state, a time interval from a termination of the temporary wake up to a start of a subsequent temporary wake up based on a specific condition during the temporary wake up.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8A illustrates an exemplary normal time interval according to the first embodiment;

FIG. 8B illustrates an exemplary short time interval according to the first embodiment.

DETAILED DESCRIPTION

Figure 1:
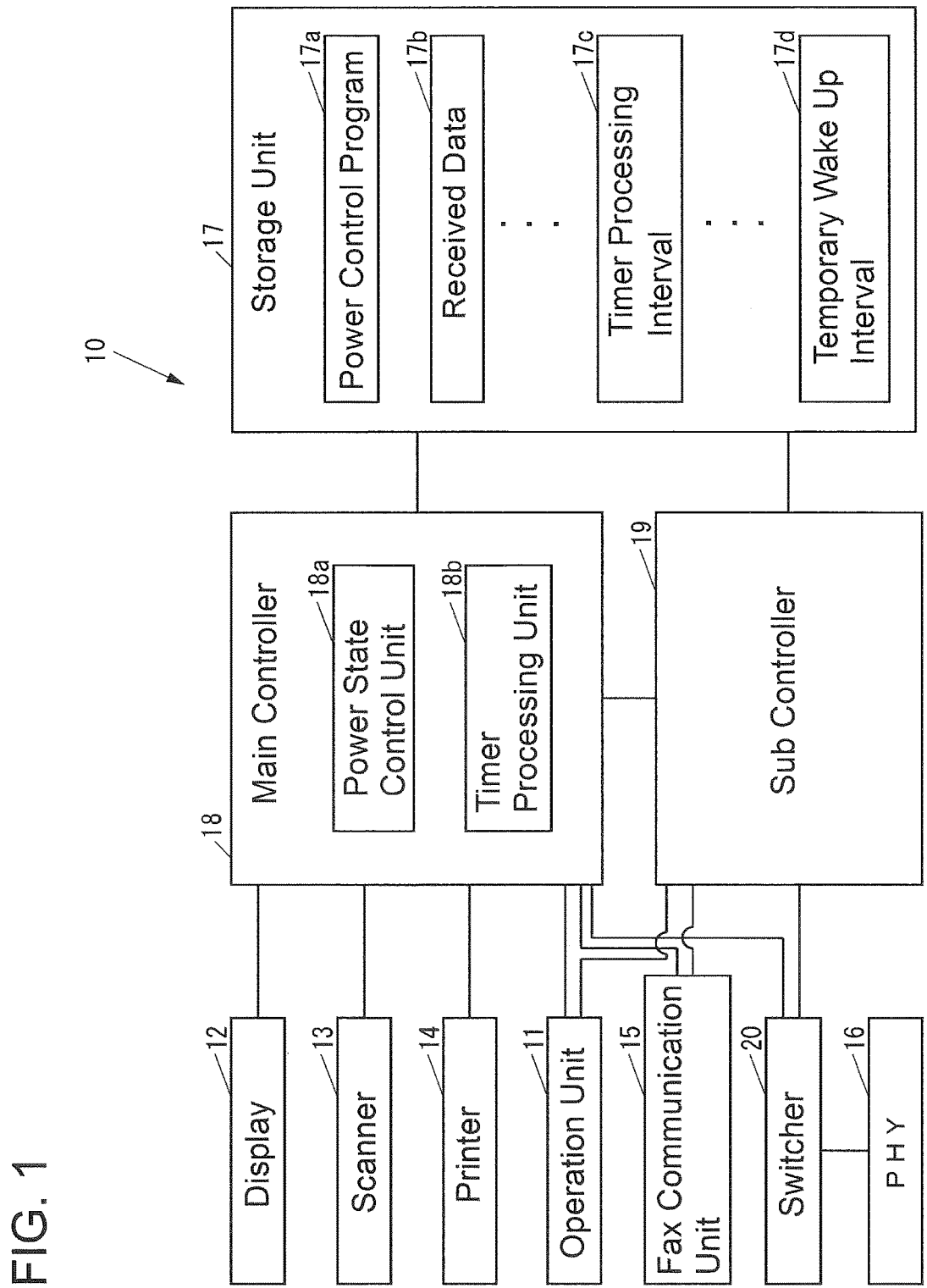
FIG. 1 illustrates a configuration of an MFP according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes respective embodiments of the disclosure with reference to the drawings.

First Embodiment

First, the following describes a configuration of a Multifunction Peripheral (MFP) as an electronic device according to a first embodiment.

FIG. 1 illustrates a configuration of an MFP 10 according to the first embodiment of the disclosure.

As illustrated in FIG. 1, the MFP 10 includes an operation unit 11, a display 12, a scanner 13, a printer 14, a fax communication unit 15, a Physical Layer (PHY) device 16, a storage unit 17, a main controller 18, a sub controller 19, and a switcher 20. The operation unit 11 is an input device, such as a button to which various operations are input. The display 12 is a display device such as Liquid Crystal Display (LCD), which displays various pieces of information. The scanner 13 is a reading device that reads an image from an original document. The printer 14 is a print device that executes printing on a recording medium, such as a paper sheet. The fax communication unit 15 is a fax device that perform a fax communication with an external facsimile device (not illustrated) via a communication line such as a dial-up line. The PHY device 16 is a network communication device, such as a Network Interface Card (NIC), that communicates with an external device via a network, such as a Local Area Network (LAN). The storage unit 17 is a non-volatile storage device, such as a semiconductor memory and a Hard Disk Drive (HDD) that store various kinds of information. The main controller 18 is a device that ensures an execution of processing corresponding to received data of all protocols that the MFP 10 supports. The sub controller 19 is a device that ensures an execution of processing corresponding to received data (example of first received data) of only a part of the protocols among all the protocols that the MFP 10 supports. The switcher 20 is a device that switches transmission and reception of a network packet to any of the main controller 18 and the sub controller 19.

The storage unit 17 stores a power control program 17a for controlling power of the MFP 10. The power control program 17a may be installed into the MFP 10 at production stage of the MFP 10, may be additionally installed into the MFP 10 from an external storage medium, such as an SD card and a Universal Serial Bus (USB) memory, or may be additionally installed into the MFP 10 from a network.

The storage unit 17 stores a plurality of pieces of received data 17b by the PHY device 16.

The storage unit 17 stores a timer processing interval 17c indicating a time interval of timer processing (described below) for each kind of the timer processing.

The storage unit 17 stores a temporary wake up interval 17d indicating a temporary wake up time interval (described below).

The main controller 18 includes, for example, a Central Processing Unit (CPU), a Read Only Memory (ROM), and a Random Access Memory (RAM). The ROM stores programs and various data. The RAM is used as a work area for the CPU in the main controller 18 itself. The CPU in the main controller 18 executes the program stored in the ROM in the storage unit 17 or the main controller 18.

The sub controller 19 similarly includes, for example, a CPU, a ROM, and a RAM. The ROM stores programs and various data. The RAM is used as a work area for the CPU in the sub controller 19 itself. The CPU in the sub controller 19 executes the program stored in the ROM in the sub controller 19.

The main controller 18 ensures an execution of processing corresponding to received data (example of second received data) of a protocol with which the sub controller 19 is not compatible. For example, the main controller 18 ensures an execution of a printing process by the printer 14 corresponding to received data of a protocol for printing, such as a Line PRinter daemon protocol (LPR) and a Raw protocol. However, the sub controller 19 is not able to execute the printing process by the printer 14 corresponding to the received data of the protocol for printing. Namely, the main controller 18 constitutes a second processing unit of the disclosure, and the sub controller 19 constitutes a first processing unit of the disclosure.

The main controller 18 ensures an update request of a lease period of an Internet Protocol (IP) address of the MFP 10 as a Dynamic Host Configuration Protocol (DHCP) client to a DHCP server before the lease period ends. On the other hand, the sub controller 19 does not ensure an execution of the update of the lease period of the IP address of the MFP 10 on the performance.

The main controller 18 ensures transmission of a report mail as an e-mail for notifying various states of the MFP 10, such as a toner remaining amount and a counter value of printing, of the printer 14, for every time interval indicated by the timer processing interval 17c, for example, every one minute. On the other hand, the sub controller 19 does not ensure an execution of the transmission of the report mail in performance.

The sub controller 19 ensures an execution of processing corresponding to received data of a protocol, which is frequently transmitted or received in a network such as an Address Resolution Protocol (ARP).

The sub controller 19, as described above, executes a small number of kinds of the processings compared with the processing executable by the main controller 18. Thus, the sub controller 19 may have a low performance compared with the main controller 18. For example, the CPU in the sub controller 19 may have a low processing performance compared with the CPU in the main controller 18. The RAM in the sub controller 19 may have a small storage capacity compared with the RAM in the main controller 18. When the sub controller 19 has the low performance compared with the performance of the main controller 18, the electric power consumed by the sub controller 19 is small compared with the electric power consumed by the main controller 18.

The main controller 18 is connected to the operation unit 11, the display 12, the scanner 13, the printer 14, the fax communication unit 15, the storage unit 17, the sub controller 19, and the switcher 20. The main controller 18 is additionally connected to the PHY device 16 via the switcher 20.

The sub controller 19 is connected to the operation unit 11, the fax communication unit 15, the storage unit 17, the main controller 18 and the switcher 20. The sub controller 19 is additionally connected to the PHY device 16 via the switcher 20.

The switcher 20 continues to count the number of packets of a specific protocol included in the received data by the PHY device 16. Here, the specific protocol is, for example, a protocol of a User Datagram Protocol (UDP) system such as a Simple Network Management Protocol (SNMP), and a Domain Name System (DNS) protocol, that is, a "protocol that does not execute delivery confirmation." The specific protocol is not a protocol to which the sub controller 19 responses. The specific protocol does not include a "protocol that executes delivery confirmation," such as a protocol of a Transmission Control Protocol (TCP) system.

The main controller 18 executes the power control program 17a stored in the storage unit 17 to function as: a power state control unit 18a that control a power state of the MFP 10; and a timer processing unit 18b that intermittently repeats a specific processing (hereinafter referred to as "timer processing") executed by the main controller 18 itself corresponding to a time.

Here, the timer processing includes an update of the lease period of the above-described IF address of the MFP 10, and transmission of the above-described report mail. An administrator of the MFP 10 is allowed to set a repeat interval of the timer processing. The repeat interval of the timer processing is also referred to as the timer processing interval 17c.

Figure 2:
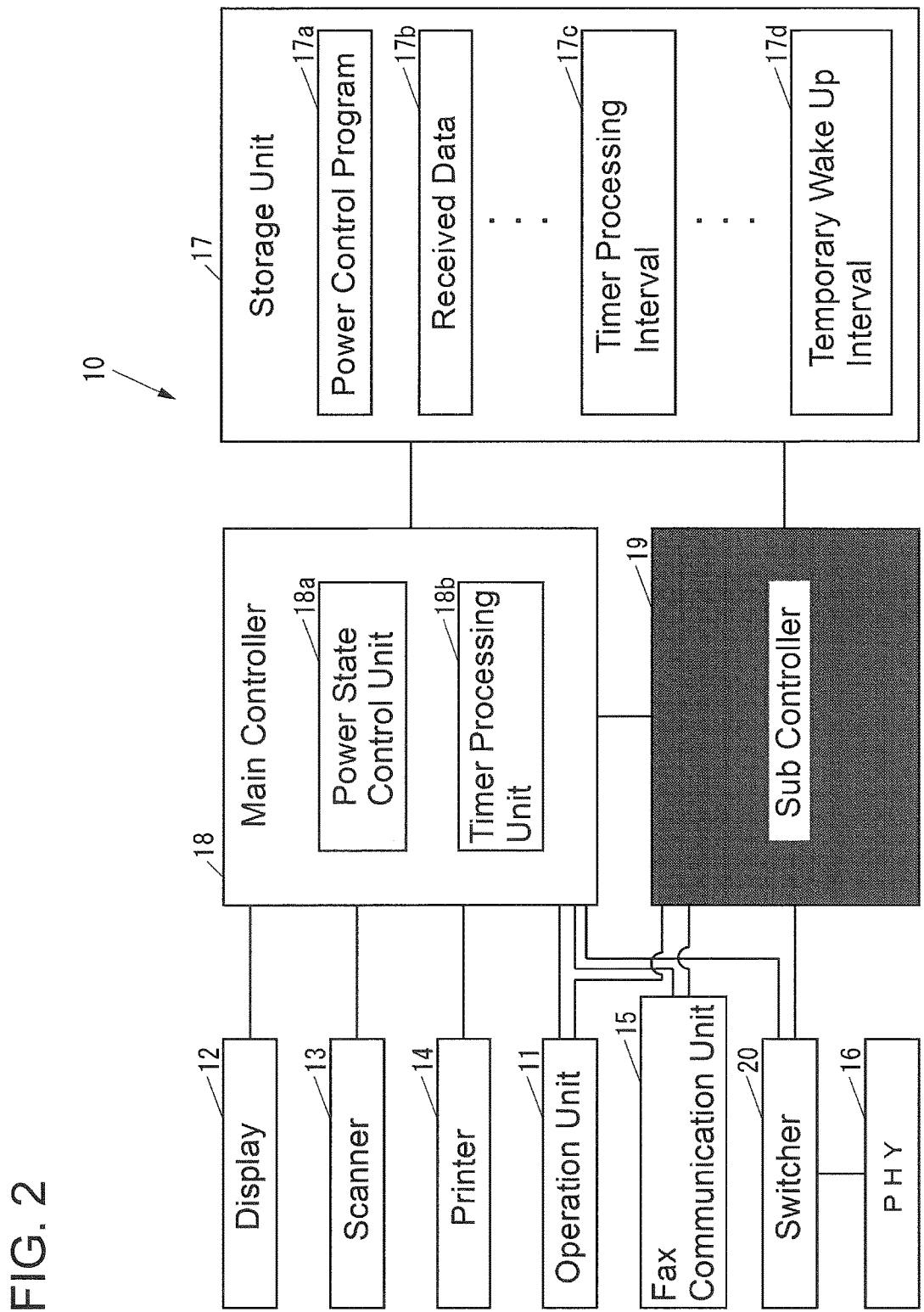
FIG. 2 illustrates a state of the MFP according to the first embodiment in a normal state.

FIG. 2 illustrates a state of the MFP 10 according to the first embodiment in a normal state.

In FIG. 2, a device where supply of electric power is stopped is illustrated with black-and-white inversion. That is, the supply of the electric power to the sub controller 19 is stopped in FIG. 2.

The switcher 20 switches the transmission and reception of the network packet to the main controller 18 among the main controller 18 and the sub controller 19 in the normal state. The main controller 18 consequently executes processing corresponding to the received data by the PHY device 16 in the normal state.

As described above, when the electric power consumed by the sub controller 19 is small compared with the electric power consumed by the main controller 18, and even the sub controller 19 is supplied with electric power, the electric power consumed by the sub controller 19 is considered to be small. Thus, the sub controller 19 may be consequently supplied with electric power in the normal state. When, even in the normal state, not the main controller 18 but the sub controller 19 executes processing executable for the sub controller 19 among the processing corresponding to the received data by the PHY device 16, the sub controller 19 needs to be supplied with electric power in the normal state. When the main controller 18 receives the received data by the PHY device 16 via the sub controller 19, the sub controller 19 needs to be supplied with electric power in the normal state.

Figure 3:
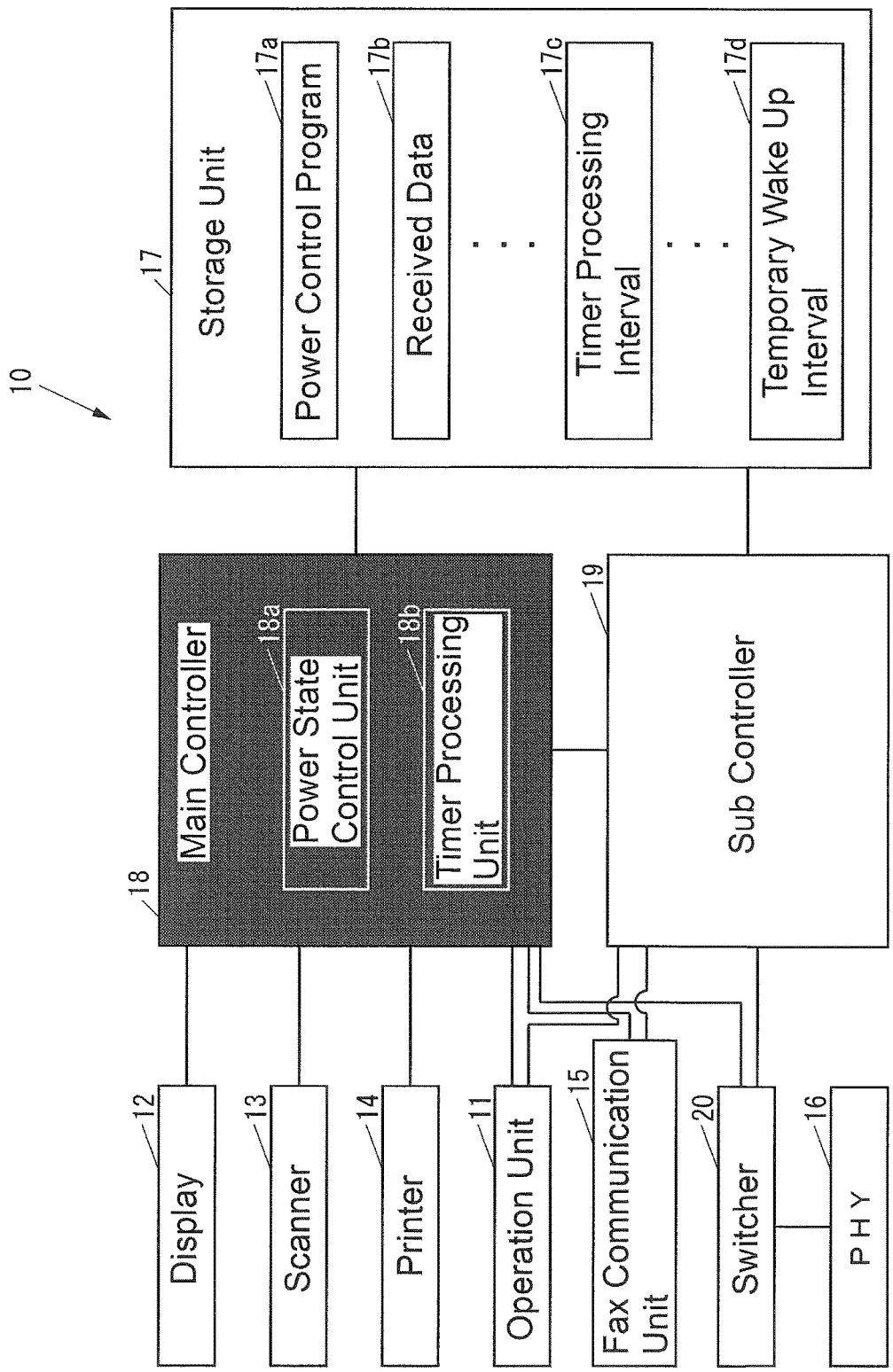
FIG. 3 illustrates a state of the MFP according to the first embodiment in a power-saving state.

FIG. 3 illustrates a state of the MFP 10 according to the first embodiment in a power-saving state.

In FIG. 3, a device where supply of electric power is stopped is illustrated with black-and-white inversion. That is, the supply of the electric power to the main controller 18 is stopped in FIG. 3. Supply of electric power to at least one of various devices other than the main controller 18, which are connected to the main controller 18, for example, the printer 14 and similar unit, may be stopped in the power-saving state.

The switcher 20 switches the transmission and reception of the network packet to the sub controller 19 among the main controller 18 and the sub controller 19, in the power-saving state. The sub controller 19 consequently executes processing corresponding to the received data by the PHY device 16 in the power-saving state.

Figure 4:
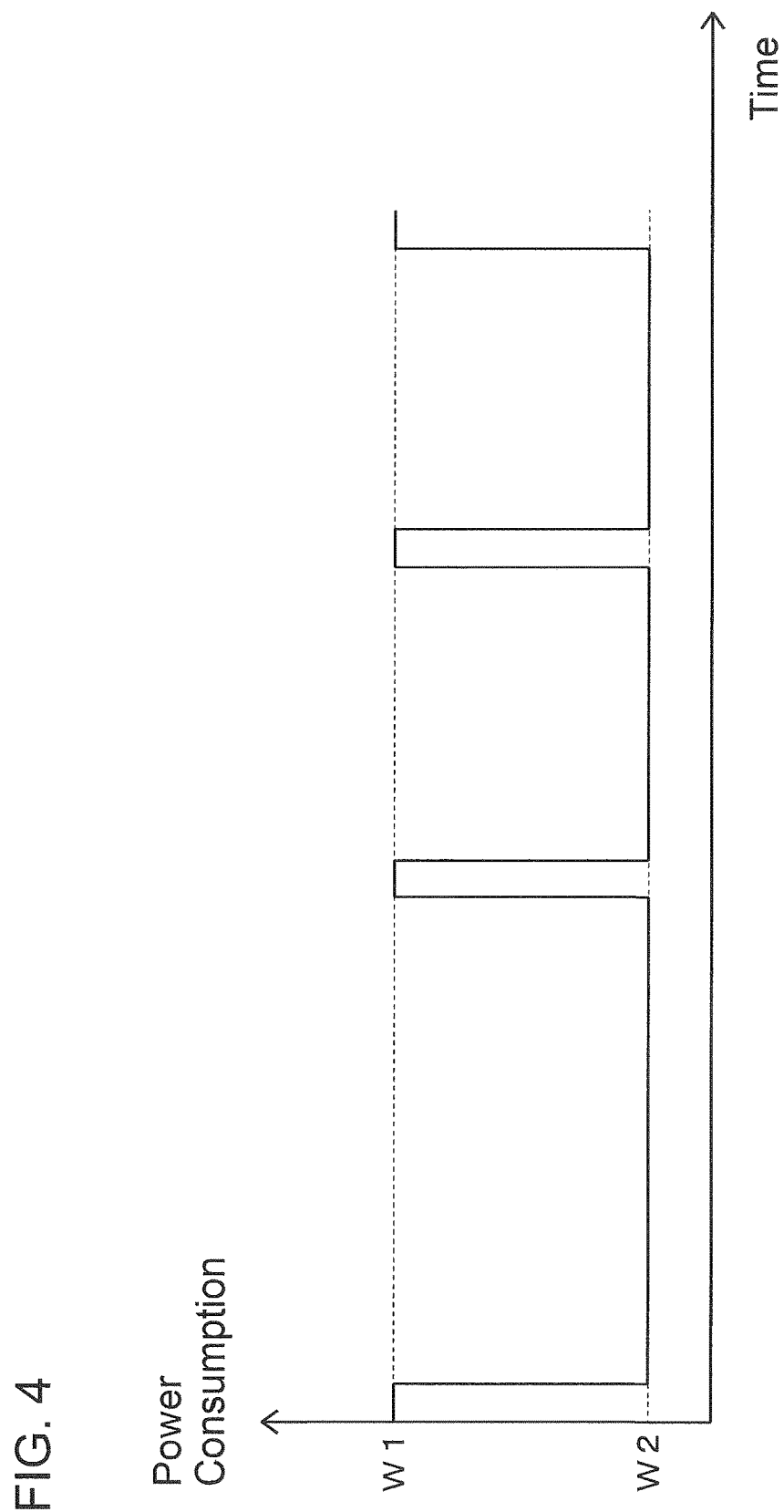
FIG. 4 illustrates an exemplary time change of power consumption of the MFP according to the first embodiment.

FIG. 4 illustrates an exemplary time change of power consumption of the MFP 10 according to the first embodiment.

In FIG. 4, W1 indicates power consumption when the power state of the MFP 10 is in the normal state. W2 indicates power consumption when the power state of the MFP 10 is in the power-saving state.

As illustrated in FIG. 4, the power state control unit 18a is capable of switching the power state of the MFP 10 from the normal state to the power-saving state, which causes small power consumption compared with the power consumption of the normal state. For example, when the MFP 10 has not received any operation via the operation unit 11 other than a button for transition to the power-saving state (hereinafter referred to as a "Sleep button"), or specific received data, such as print data, via the PHY device 16 during a specific period or more in the normal state, the power state control unit 18a becomes capable of switching the power state of the MFP 10 to the power-saving state. When an operation is received via the Sleep button in the normal state, the power state control unit 18a becomes capable of switching the power state of the MFP 10 to the power-saving state.

Even when the MFP 10 is in the power-saving state, the sub controller 19 executes a basic response to the network. Then the MFP 10 ensures the network connectivity.

The sub controller 19 is capable of switching the power state of the MFP 10 from the power-saving state to the normal state, which causes the large power consumption compared with the power consumption of the power-saving state. For example, when an operation is received via the operation unit 11 in the power-saving state, the sub controller 19 becomes capable of switching the power state of the MFP 10 to the normal state. When specific received data, such as print data, is received via the PHY device 16 in the power-saving state, the sub controller 19 becomes capable of switching the power state of the MFP 10 to the normal state. When the sub controller 19 receives specific received data to be executed by the main controller 18 via the PHY device 16 in the power-saving state, the sub controller 19 stores the received data in the storage unit 17 as the received data 17b so as to hand the received data 17b to the main controller 18 via the storage unit 17 after the wake up.

When the power state of the MFP 10 is in the power-saving state and the received data is unprocessable by the sub controller 19, the MFP 10 switches the power state to the normal state from the power-saving state. This causes the main controller 18 to wake up, and then causes the main controller 18 to respond to the received data after the wake up. These processes ensure maintaining of the network connectivity.

Power consumption in the power-saving state is W2 as mainly illustrated in FIG. 4. However, in practice, the power consumption in the power-saving state is not constantly W2 because a temporary wake up of the supply of the electric power to the main controller 18 (hereinafter referred to as a "temporary wake up") is intermittently repeated in the power-saving state.

Figure 5:
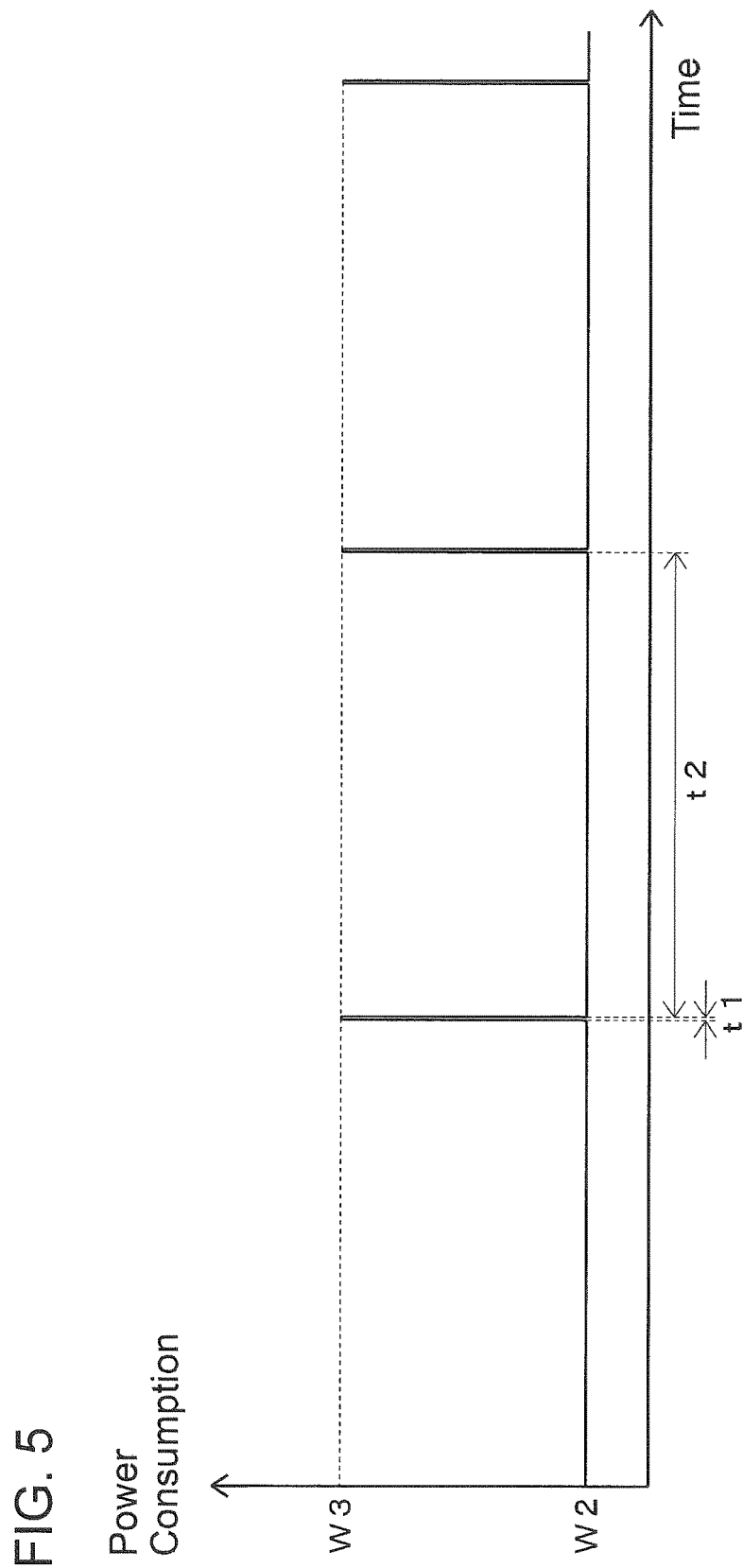
FIG. 5 illustrates an exemplary time change of power consumption of the MFP according to the first embodiment in the power-saving state.

FIG. 5 illustrates an exemplary time change of power consumption of the MFP 10 according to the first embodiment in the power-saving state.

In FIG. 5, W3 indicates the power consumption in a temporary wake up state. W3 is equal to or less than W1 illustrated in FIG. 4. When the normal state and the temporary wake up state have an identical supply state of the electric power to various devices in the MFP 10, the W3 is equal to the W1. In contrast, when supply of the electric power to a device such as the printer 14, which is supplied with electric power in the normal state, is stopped in the temporary wake up state, W3 is small compared with W1.

As illustrated in FIG. 5, the sub controller 19 intermittently repeats the temporary wake up in the power-saving state. Here, a time interval t1 from start to termination of the temporary wake up is usually and extremely short compared with a time interval t2 from termination of the temporary wake up to start of a subsequently temporary wake up. While, for example, the time interval t1 is around 100 to 200 milli seconds, the time interval t2l is usually around 3 to 30 seconds.

Next, the following describes an operation of the MFP 10.

Figure 6:
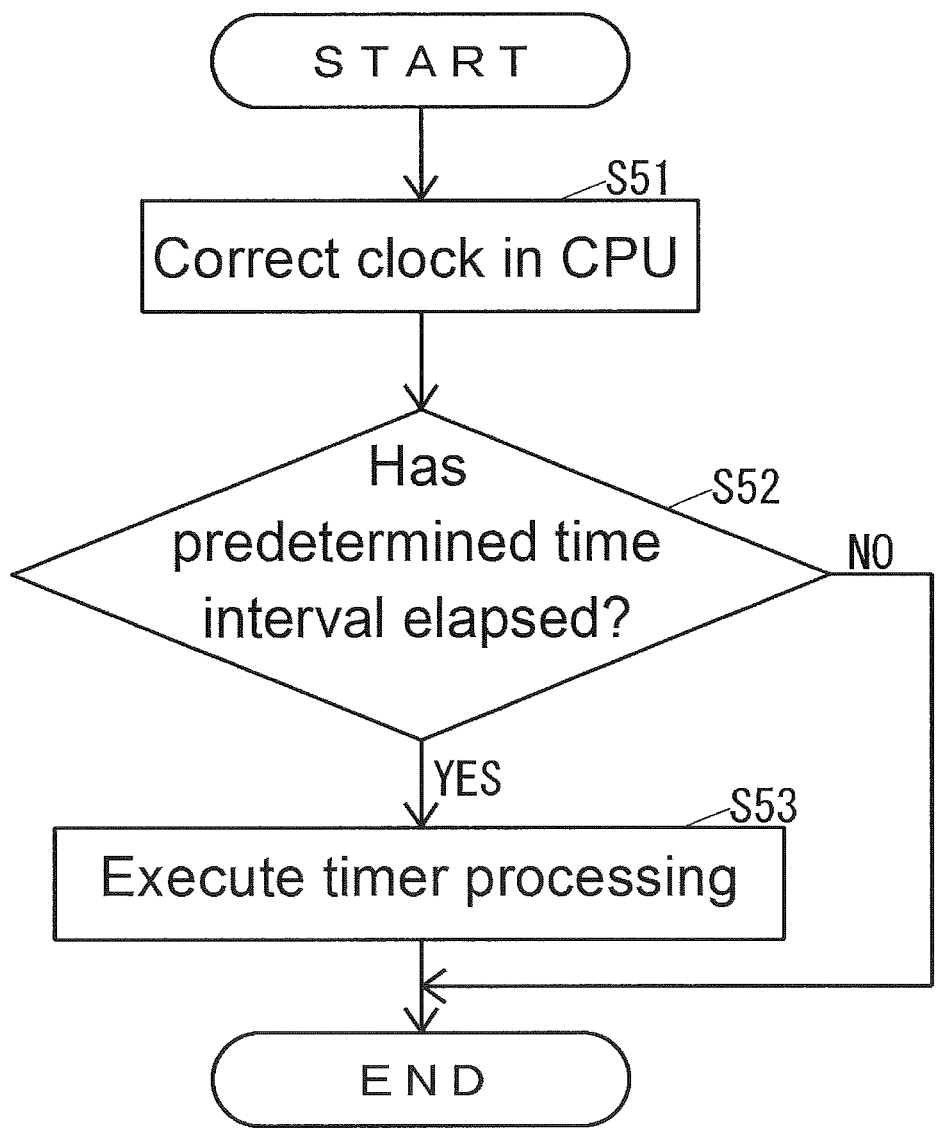
FIG. 6 illustrates an operation of a timer processing unit according to the first embodiment during temporary wake up time.

FIG. 6 illustrates an operation of the timer processing unit 18b according to the first embodiment during the temporary wake up.

As illustrated in FIG. 6, the timer processing unit 18b causes a real-time clock (not illustrated) to correct a clock in the CPU in the main controller 18 using the temporary wake up (Step S51).

Next, the timer processing unit 18b determines whether or not a time interval indicated by the timer processing interval 17c has passed after an execution of previous timer processing based on the clock in the CPU in the main controller 18 (Step S52).

When the timer processing unit 18b determines, at Step S52, that the time interval has passed, the timer processing unit 18b executes the timer processing (Step S53), and terminates the operation illustrated in FIG. 6. In contrast, when the timer processing unit 18b determines, at Step S52, that the time interval has not passed, the timer processing unit 18b does not execute the timer processing, and terminates the operation illustrated in FIG. 6.

The timer processing unit 18b repeats processes of Steps S52 and S53 for each kind of the timer processing.

For example, the timer processing unit 18b requests the DHCP server to update the lease period of the IP address of the MFP 10 at the time interval indicated by the timer processing interval 17c, such as a time interval at which a half of the lease period of the IP address of the MFP 10 has elapsed.

The timer processing unit 18b transmits a report mail at the time interval indicated by the timer processing interval 17c, for example, every one minute.

Figure 7:
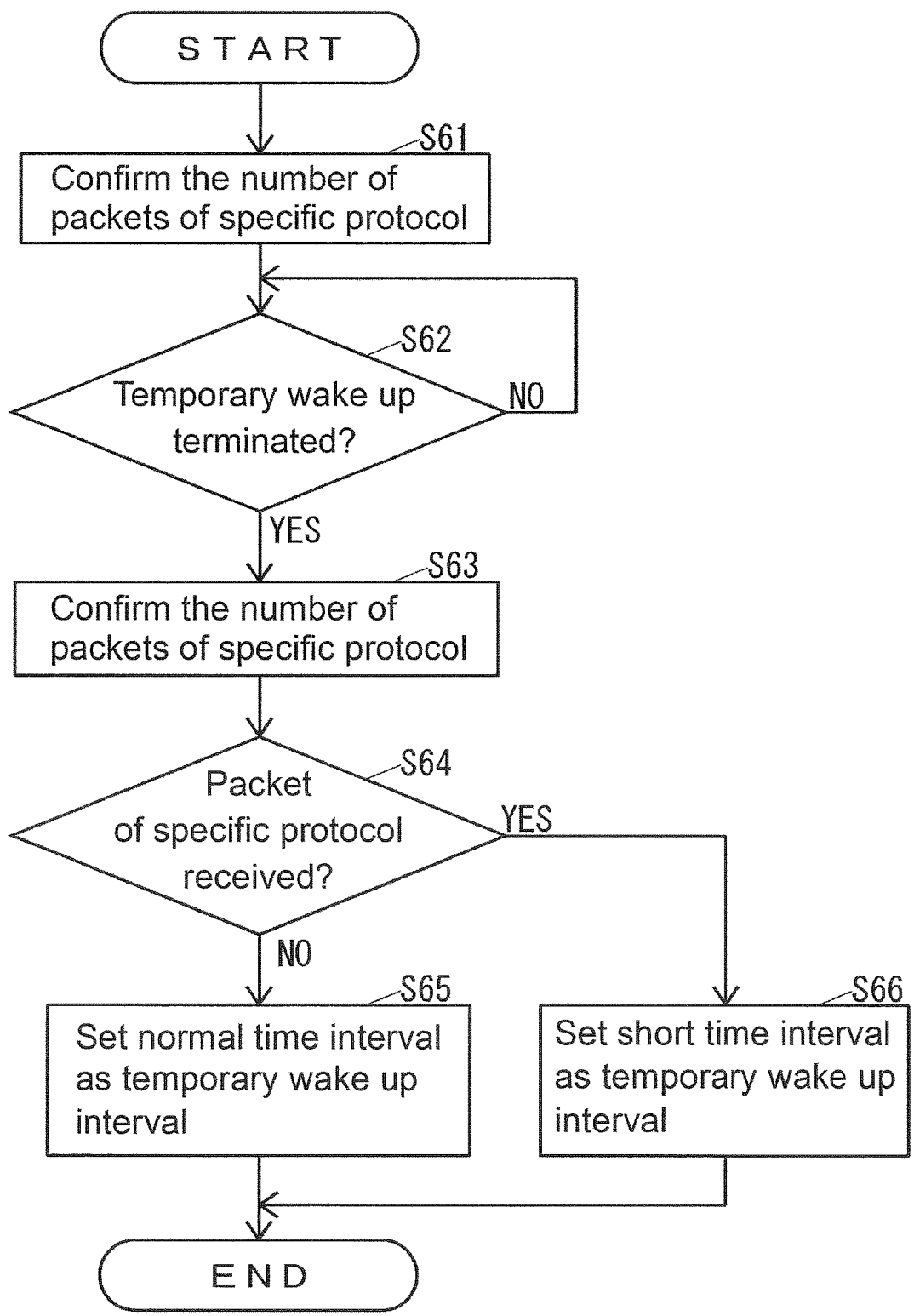
FIG. 7 illustrates an operation of a power state control unit according to the first embodiment during temporary wake up time.

FIG. 7 illustrates an operation of the power state control unit 18a according to the first embodiment during the temporary wake up.

The power state control unit 18a starts the operation illustrated in FIG. 7 at a time point at which the temporary wake up starts.

As illustrated in FIG. 7, the power state control unit 18a confirms the number of the packets of the specific protocol counted by the switcher 20 (Step S61).

Next, the power state control unit 18a determines whether or not the temporary wake up terminates until the determination of the termination of the temporary wake up (Step S62).

When the power state control unit 18a determines, at Step S62, that the temporary wake up terminates, the power state control unit 18a confirms the number of the packets of the specific protocol counted by the switcher 20 (Step S63).

Next, the power state control unit 18a determines whether or not the packet of the specific protocol is received during the current temporary wake up (Step S64). Here, when the number confirmed at Step S61 and the number confirmed at Step S63 are not different, the power state control unit 18a determines that the packet of the specific protocol was not received during the current temporary wake up. On the other hand, when the number confirmed at Step S61 and the number confirmed at Step S63 are different, the power state control unit 18a determines that the packet of the specific protocol was received during the current temporary wake up.

After the power state control unit 18a determines, at Step S64, that the packet of the specific protocol was not received during the current temporary wake up, the power state control unit 18a sets a normal time interval as the temporary wake up interval 17d (Step S65), and terminates the operation illustrated FIG. 7. Here, the normal time interval is, for example, 30 seconds.

After the power state control unit 18a determines, at Step S64, that the packet of the specific protocol was received during the current temporary wake up, the power state control unit 18a sets a short time interval, which is shorter than the normal time interval, as the temporary wake up interval 17d (Step S66), and terminates the operation illustrated in FIG. 7. Here, the short time interval is, for example, 3 seconds.

Then, the sub controller 19 sets a time interval t2 from a termination of the current temporary wake up to a start of a subsequently temporary wake up to a time interval indicated by the temporary wake up interval 17d. When the packet of the specific protocol is not received during the current temporary wake up, the time interval t2 from the termination of the current temporary wake up to the start of the subsequently temporary wake up is consequently set to the normal time interval as illustrated in FIG. 8A. When the packet of the specific protocol is received during the current temporary wake up, the time interval t2 from the termination of the current temporary wake up to the start of the subsequently temporary wake up is set to the short time interval as illustrated in FIG. 8B.

As described above, the MFP 10 determines the time interval t2 from the termination of the current temporary wake up to the start of the subsequently temporary wake up in the power-saving state based on content of the received data during the current temporary wake up in the power-saving state (Steps S64 to S66). This ensures a long time interval t2 from the termination of the current temporary wake up to the start of the subsequently temporary wake up (Step S65) when the content of the received data during the current temporary wake up does not necessitate the prompt execution of the subsequently temporary wake up (NO at Step S64). The MFP 10 consequently lengthens a period for stop of the supply of the electric power to the main controller 18, thus ensuring the reduced power consumption.

When the received data during the current temporary wake up includes the packet of the specific protocol (YES at Step S64), the MFP 10 shortens the time interval t2 from the termination of the current temporary wake up to the start of the subsequently temporary wake up in the power-saving state (Step S66) compared with a case where the received data during the current temporary wake up does not include the packet of the specific protocol (NO at Step S64). This configuration causes the MFP 10 to determine the time interval t2 from the termination of the current temporary wake up to the start of the subsequently temporary wake up in the power-saving state corresponding to the protocol of the packet included in the received data during the current temporary wake up in the power-saving state. This ensures the reduced power consumption with a simple configuration.

The MFP 10 may include content other than the content whether or not the received data during the current temporary wake up includes the packet of the specific protocol as "content of the received data during the current temporary wake up" for determining the time interval t2 from the termination of the current temporary wake up to the start of the subsequently temporary wake up in the power-saving state.

When the received data during the current temporary wake up in the power-saving state includes a packet of the "protocol that does not execute delivery confirmation" (YES at Step S64), the MFP 10 shortens the time interval t2 from the termination of the current temporary wake up to the start of the subsequently temporary wake up in the power-saving state (Step S66). This ensures transmission of a response packet after the MFP 10 promptly executes a subsequently temporary wake up even when the current temporary wake up terminates before transmission of the response packet to the packet of the "protocol that does not execute delivery confirmation" among the received data during the current temporary wake up in the power-saving state. This causes the MFP 10 to prevent a transmission delay of the response packet to a communication partner who has transmitted the packet of the "protocol that does not execute delivery confirmation." The MFP 10 consequently ensures the reduced possibility that the transmission delay of the response packet causes the communication partner to be provided with incorrect recognition that the response packet is not transmitted. That is, the MFP 10 ensures maintaining the network connectivity.

When the received data during the current temporary wake up in the power-saving state includes a packet of the "protocol that executes delivery confirmation," and even the current temporary wake up terminates before transmission of the response packet to the packet of the "protocol that executes delivery confirmation" among the received data during the current temporary wake up in the power-saving state, the delivery confirmation is received from the communication partner. When the delivery confirmation is received during the time interval t2 from the termination of the current temporary wake up to the start of the subsequently temporal in the power-saving state, the MFP 10 consequently executes the subsequently temporary wake up, regardless of the time interval t2, at the point at which the delivery confirmation is received (that is, the MFP 10 instantly executes the temporary wake up after the delivery confirmation is received). This causes the main controller 18 to transmit the response packet.

The MFP 10 may employ a protocol other than the "protocol that does not execute delivery confirmation" as the specific protocol.

As described above, the MFP 10 determines the time interval t2 from the termination of the current temporary wake up to the start of the subsequently temporary wake up in the power-saving state as any one of two types of time intervals, namely, the normal time interval and the short time interval corresponding to the protocol of the packet included in the received data during the current temporary wake up in the power-saving state. That is, the MFP 10 switches to the normal time interval or the short time interval as the time interval t2 corresponding to the protocol of the packet included in the received data during the current temporary wake up in the power-saving state. Thus, the MFP 10 consequently ensures a determination of the time interval t2 in a simple process, and the reduced process load for determining the time interval t2.

The MFP 10, however, may employ a method other than the method for switching to the normal time interval or the short time interval as "method for shortening the time interval t2 from the termination of the current temporary wake up to the start of the subsequently temporary wake up in the power-saving state compared with the case where the received data during the current temporary wake up does not include the packet of the specific protocol when the received data during the current temporary wake up includes the packet of the specific protocol."

For example, the MFP 10 may employ a method of multiplying the time interval t2 from a termination of a previous temporary wake up to a start of the current temporary wake up in the power-saving state by a specific magnification, for example, two to ten times, so as to lengthen the time interval t2 from the termination of the current temporary wake up to a start of the subsequently temporary wake up in the power-saving state when the received data during the current temporary wake up in the power-saving state does not include the packet of the specific protocol. The MFP 10 may employ a method of multiplying the time interval t2 from a termination of a previous temporary wake up to a start of the current temporary wake up in the power-saving state by a specific magnification, for example, 0.1 to 0.5 times, so as to shorten the time interval t2 from the termination of the current temporary wake up to a start of the subsequently temporary wake up in the power-saving state when the received data during the current temporary wake up in the power-saving state includes the packet of the specific protocol. Here, assume that the MFP 10 sets an initial value and an upper limit value of the time interval t2 as the normal time interval, and sets a lower limit value of the time interval t2 to a value identical to the time interval t1. This configuration causes the MFP 10 to set the time interval t2 from the termination of the current temporary wake up to the start of the subsequently temporary wake up in the power-saving state to an appropriate length without excessively shortening the time interval t2 even when the received data during the current temporary wake up includes the packet of the specific protocol. This does not cause an excessively short period for the stop of the supply of the electric power to the main controller 18, and then ensures the reduced power consumption.

Second Embodiment

Figure 9:
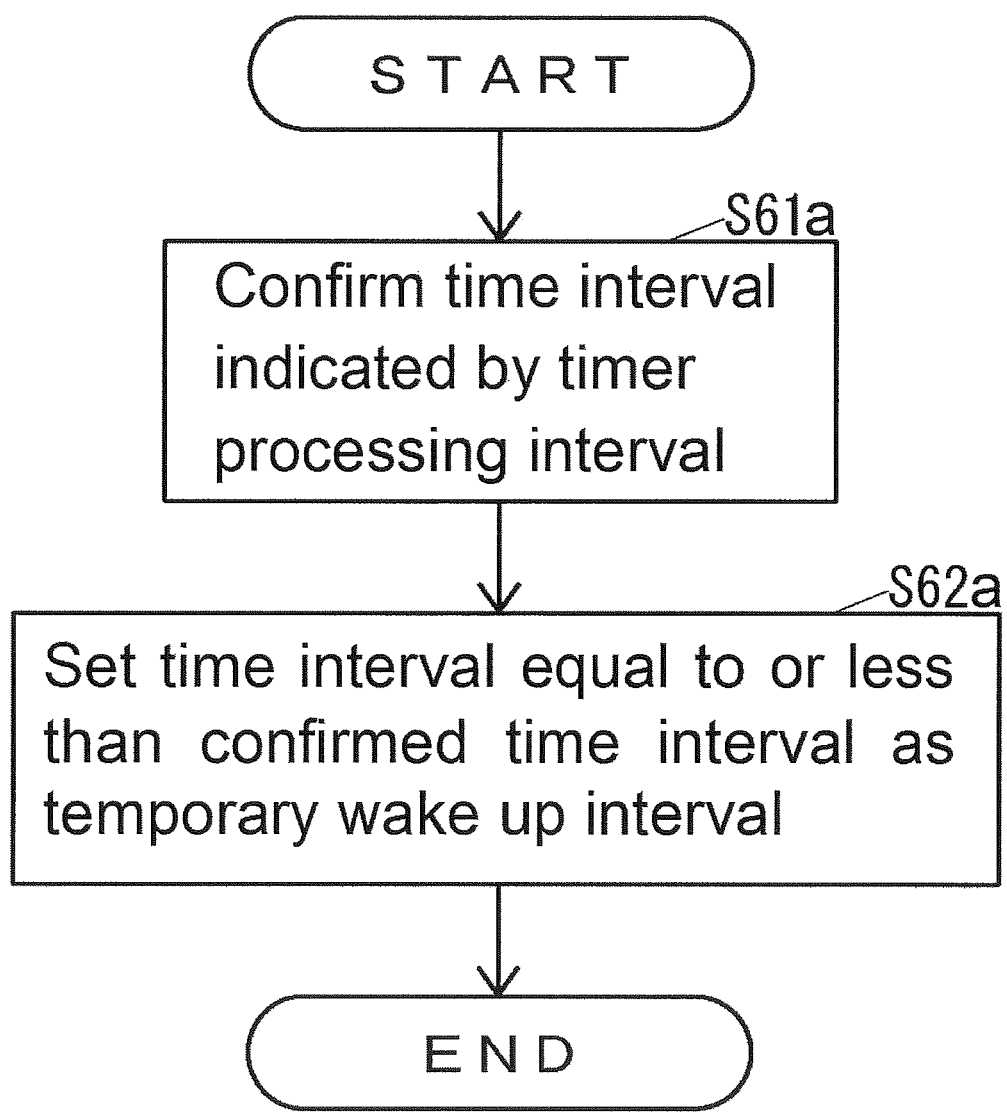
FIG. 9 illustrates an operation of a power state control unit according to a second embodiment during temporary wake up time.

FIG. 9 illustrates an operation of a power state control unit 18a according to the second embodiment during a temporary wake up. The second embodiment includes different content of a process from the first embodiment.

As illustrated in FIG. 9, the power state control unit 18a confirms a time interval indicated by a timer processing interval 17c (Step S61a).

Subsequently, the power state control unit 18a sets a time interval equal to or less than the time interval confirmed at Step S61a as a temporary wake up interval 17d (Step S62a), and terminates the operation illustrated in FIG. 9.

Here, when the time interval indicated by the timer processing interval 17c is one minute, the temporary wake up interval 17d is set to a time interval equal to or less than one minute. When the time interval indicated by the timer processing interval 17c is 30 minutes, the temporary wake up interval 17d is set to a time interval equal to or less than 30 minutes.

When the temporary wake up interval 17d is less than a time interval t1 from start to termination of the temporary wake up, a total period of periods of the temporary wake up in the power-saving state is longer than a total period of periods other than the period of the temporary wake up in the power-saving state, and however, this reduces the effect of reduced power consumption in the power-saving state to less than a half compared with a case where the temporary wake up is not executed in the power-saving state. Thus, the temporary wake up interval 17d is preferred to be set to equal to or more than the time interval t1 from the start to termination of the temporary wake up. When the temporary wake up interval 17d is set to equal to or more than the time interval t1, the total period of the periods of the temporary wake up in the power-saving state becomes equal to or less than the total period of the periods other than the period of the temporary wake up in the power-saving state. This causes the MFP 10 to prevent the reduced effect of reduced power consumption in the power-saving state to less than a half compared with the case where the temporary wake up is not executed in the power-saving state.

When a plurality of timer processing intervals 17c indicate different time intervals, the temporary wake up interval 17d is set to a time interval equal to or less than the shortest time interval among the time intervals indicated by the respective plurality of the timer processing intervals 17c.

From the aspect of reduced power consumption, a state of power consumption W2 is preferably long. The temporary wake up interval 17d, then, is preferably long. For example, the temporary wake up interval 17d may be a time interval equal to the time interval indicated by the timer processing interval 17c.

When an execution timing of timer processing according to the time interval indicated by the timer processing interval 17c has come during the temporary wake up, the power state control unit 18a determines an period calculated by subtracting the time interval t1 from the start to termination of the temporary wake up from the time interval indicated by the timer processing interval 17c as the temporary wake up interval 17d. This configuration causes the MFP 10 to execute the timer processing according to the time interval indicated by the timer processing interval 17c because when the execution timing of the timer processing according to the time interval indicated by the timer processing interval 17c comes once during the temporary wake up, an execution timing of subsequent timer processing also comes during the temporary wake up.

After the operation illustrated in FIG. 9, a sub controller 19 sets a time interval t2 from a termination of the current temporary wake up to a start of a subsequently temporary wake up to a time interval indicated by the temporary wake up interval 17d.

As described above, the MFP 10 determines a specific setting confirmed during the current temporary wake up in the power-saving state (Step S61a), that is, the time interval t2 from the termination of the current temporary wake up to the start of the subsequently temporary wake up in the power-saving state (Step 562a) based on the timer processing interval 17c. This ensures a long time interval t2 from the termination of the current temporary wake up to the start of the subsequently temporary wake up when the specific setting confirmed during the current temporary wake up is a setting that the subsequently temporary wake up is not necessary to be executed promptly. This causes the MFP 10 to lengthen the period for stop of supply of electric power to a main controller 18, and then to ensures the reduced power consumption.

The MFP 10 repeats the temporary wake up in the power-saving state at the repeat interval of the specific processing or the timer processing, that is, at a time interval equal to or less than the timer processing interval 17c. The MFP 10 consequently ensures the appropriate execution of the timer processing, which is intermittently repeated corresponding to a time, during the temporary wake up in the power-saving state compared with a case where the temporary wake up in the power-saving state is repeated at a longer time interval than the timer processing interval 17c of the timer processing.

While the specific setting in the embodiment is the timer processing interval 17c, the MFP 10 may include a setting other than the timer processing interval 17c as the specific setting.

Since among the main controller 18 and the sub controller 19 in the MFP 10, only the main controller 18 uses the power control program 17a and the timer processing interval 17c, the power control program 17a and the timer processing interval 17c may be stored in a storage device exclusive for the main controller 18, such as a non-volatile storage device internally included in the main controller 18. Then, the supply of electric power to the storage device exclusive for the main controller 18 is executed via an identical process to supply of electric power to the main controller 18.

While the electronic device of the disclosure is the MFP in the respective embodiments, the electronic device of the disclosure may be an image forming apparatus other than the MFP, such as a copy-only machine, a printer-only machine, a FAX-only machine, and a scanner-only machine, and may be the electronic device other than the image forming apparatus, such as a Personal Computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device comprising:
a first processing device that executes a process according to first received data of received data including the first received data and second received data
a second processing device that executes a process according to the second received data unprocessable by the first processing device; and
a processor that executes a control program,
wherein when executing the control program, the processor operates to:
control a power state of the electronic device, the power state including a normal state and a power-saving state, the second processing device ensuring the execution of the process according to the received data in the normal state, the power-saving state at least temporarily stopping supplying the second processing device with electric power while the first processing device ensuring the execution of the process according to the first received data; and
determine, when a temporary wake up of the electric power supply to the second processing device is intermittently repeated in the power-saving state, to reduce a time interval from a termination of the temporary wake up to a start of a subsequent temporary wake up when the received data during the temporary wake up includes a packet of the specific protocol, compared with the time interval when the received data during the current temporary wake up does not include a packet of the specific protocol.

2. The electronic device according to claim 1, when executing the control program, the processor further operates to:
set the time interval to a normal time interval when the received data during the current temporary wake up does not include a packet of the specific protocol; and
set the time interval to a short time interval that is shorter than the normal time interval when the received data during the current temporary wake up include a packet of the specific protocol.

3. The electronic device according to claim 1, wherein when executing the control program, the processor further operates to:
set the time interval to a longer time interval than a time interval from a termination of a previous temporary wake up to a start of the current temporary wake up when the received data during the current temporary wake up does not include a packet of the specific protocol, and
set the time interval to a shorter time interval than the time interval from the termination of the previous temporary wake up to the start of the current temporary wake up when the received data during the current temporary wake up includes a packet of the specific protocol.

4. The electronic device according to claim 1, wherein the specific protocol is a protocol that does not execute delivery confirmation.

5. The electronic device comprising:
a first processing device that executes a process according to first received data of received data including the first received data and second received data
a second processing device that executes a process according to the second received data unprocessable by the first processing device; and
a processor that executes a control program,
wherein when executing the control program, the processor operates to:
control a power state of the electronic device, the power state including a normal state and a power-saving state, the second processing device ensuring the execution of the process according to the received data in the normal state, the power-saving state at least temporarily stopping supplying the second processing device with electric power while the first processing device ensuring the execution of the process according to the first received data;
intermittently repeat a specific processing executed by the second processing unit corresponding to a time:
cause the second processing unit to execute the specific processing during the temporary wake up;
confirm, when a temporary wake up of the electric power supply to the second processing device is intermittently repeated in the power-saving state, a specific setting during the temporary wake up; and
determine, based on the confirmed specific setting, to set a time interval from a termination of the temporary wake up to a start of a subsequent temporary wake up to be equal to or less than a repeat interval of the specific processing,
wherein the specific setting is a setting of a repeat interval of the specific processing.

6. The electronic device according to claim 5,
wherein when executing the control program, the processor further operates to set the time interval to a time interval that is equal to or more than an interval from a start to a termination of the temporary wake up.

7. The electronic device according to claim 5,
wherein when executing the control program, the processor further operates to determine a period calculated by subtracting an interval from a start to a termination of the temporary wake up from the repeat interval as the time interval when an execution timing of the specific processing according to the repeat interval has come during the temporary wake up.

8. A control method for an electronic device that includes a first processing device that executes a process according to first received data of received data including the first received data and second received data and a second processing device that executes a process according to the second received data unprocessable by the first processing device, the control method comprising:
controlling a power state of the electronic device, the power state including a normal state and a power-saving state, the second processing device ensuring the execution of the process according to the received data in the normal state, the power-saving state at least temporarily stopping supplying the second processing device with electric power while the first processing device ensuring the execution of the process according to the first received data,
wherein when a temporary wake up of the electric power supply to the second processing device is intermittently repeated in the power-saving state, the controlling determines to reduce a time interval from a termination of the temporary wake up to a start of a subsequent temporary wake up when the received data during the temporary wake up includes a packet of the specific protocol, compared with the time interval when the received data during the current temporary wake up does not include a packet of the specific protocol.

* * * * *